(12) United States Patent
Bang

(10) Patent No.: US 9,381,792 B2
(45) Date of Patent: Jul. 5, 2016

(54) DEVICE FOR BLOCKING NOISE AT DIVISION CHANNEL OF REAR DOOR FOR VEHICLE

(71) Applicant: Hyundai Motor Company, Seoul (KR)
(72) Inventor: Jae Chul Bang, Seoul (KR)
(73) Assignee: Hyundai Motor Company, Seoul (KR)
( * ) Notice: Subject to any disclaimer, the term of this patent is extended or adjusted under 35 U.S.C. 154(b) by 0 days.

(21) Appl. No.: 14/483,057
(22) Filed: Sep. 10, 2014
(65) Prior Publication Data
US 2015/0165881 A1  Jun. 18, 2015

(30) Foreign Application Priority Data

Dec. 18, 2013  (KR) .................. 10-2013-0157923

(51) Int. Cl.
*B60J 5/04* (2006.01)
(52) U.S. Cl.
CPC ............. *B60J 5/0418* (2013.01); *B60J 5/045* (2013.01); *B60J 5/0408* (2013.01)
(58) Field of Classification Search
CPC .......... B60J 5/04; B60J 5/0408; B60J 5/0409; B60J 5/0411; B60J 5/0418; B60J 5/0426; B60J 5/04113; B60J 5/0416; B60J 5/04112; B60J 5/0402; B60J 5/0405; B60J 10/004; B60J 10/041; B60J 10/042
USPC .......... 296/146.1, 146.2, 146.5, 146.6, 146.9, 296/154, 39.3; 49/502
See application file for complete search history.

(56) References Cited

U.S. PATENT DOCUMENTS

| | | | | |
|---|---|---|---|---|
| 2,797,130 | A * | 6/1957 | Renno | B60J 5/0412 49/502 |
| 5,168,670 | A * | 12/1992 | Umeda | B60J 1/10 49/502 |
| 6,220,650 | B1 * | 4/2001 | Davis | B60J 10/044 296/146.16 |
| 8,042,859 | B2 * | 10/2011 | Kimoto | B60J 5/0405 296/146.1 |
| 2006/0156632 | A1 | 7/2006 | Ruppert et al. | |
| 2007/0084130 | A1 * | 4/2007 | Gaustad | B60J 1/17 49/502 |
| 2007/0262607 | A1 * | 11/2007 | Saito | B60J 5/0402 296/146.2 |
| 2008/0238134 | A1 * | 10/2008 | Guellec | B60J 10/044 296/146.2 |
| 2010/0001550 | A1 * | 1/2010 | Janisch | B60J 10/044 296/146.2 |
| 2015/0015023 | A1 * | 1/2015 | Costigan | B60J 5/0468 296/146.2 |
| 2015/0165881 | A1 * | 6/2015 | Bang | B60J 5/0418 296/146.2 |
| 2015/0246597 | A1 * | 9/2015 | Koike | B60J 10/088 49/459 |
| 2015/0251524 | A1 * | 9/2015 | Goto | B60J 10/02 52/204.71 |

FOREIGN PATENT DOCUMENTS

| | | |
|---|---|---|
| JP | 2000-512573 A | 9/2000 |
| JP | 2007-038799 A | 2/2007 |
| JP | 2009-262617 A | 11/2009 |
| KR | 10-2012-0136494 A | 12/2012 |
| WO | WO 2010/080895 A1 | 7/2010 |

* cited by examiner

*Primary Examiner* — Gregory Blankenship
(74) *Attorney, Agent, or Firm* — Morgan, Lewis & Bockius LLP

(57) ABSTRACT

A device for blocking noise at a division channel of a rear door for a vehicle may include a door inner panel having an upper end portion formed with a substantially uniform cross-sectional shape, an inside weather strip fastened over an entire length of the upper end portion of the door inner panel, a reinforcing plate mounted on an outer surface of the door inner panel, and a bracket fixedly coupled to the reinforcing plate for mounting the division channel.

9 Claims, 14 Drawing Sheets

B-B CROSS SECTION

C-C CROSS SECTION

D-D CROSS SECTION

E-E CROSS SECTION

F-F CROSS SECTION

DEVICE FOR BLOCKING NOISE AT DIVISION CHANNEL OF REAR DOOR FOR VEHICLE

CROSS-REFERENCE TO RELATED APPLICATION

The present application claims priority of Korean Patent Application Number 10-2013-0157923 filed on Dec. 18, 2013, the entire contents of which application are incorporated herein for all purposes by this reference.

BACKGROUND OF INVENTION

1. Field of Invention

The present invention relates to a device for blocking noise at a division channel of a rear door for a vehicle. More particularly, the present invention relates to a device for blocking noise at a division channel of a rear door for a vehicle, which may effectively block noise from entering through the division channel, which is a route along which a rear door glass is moved upward and downward, when a vehicle is moved.

2. Description of Related Art

In general, a vehicle body structure of a passenger vehicle is inevitably designed to have a shape that is inclined downward from a rear door toward a side luggage panel of a trunk room, and thus an upper frame of a rear door panel also has a shape that is inclined from the front side toward the rear side.

A rear portion of the upper frame of the rear door panel forms a narrow triangular space, and thus this space hinders a smooth up and down motion of a rear glass. Therefore, as the rear door glass, a movable glass, which may be moved upward and downward, is applied to the front side, and a fixed glass is applied to the rear side, based on a division channel interposed between the movable glass and the fixed glass.

As illustrated in the accompanied FIG. 1, a division channel 14 is vertically mounted between a rear door inner panel 10 and an upper frame 12 that serves as a type of a window frame when a door glass is moved upward and downward, such that as a rear door glass 16 including a movable glass 18, which may be moved upward and downward, is applied to the front side, and a fixed glass 20 is applied to the rear side, based on the division channel 14 interposed between the movable glass 18 and the fixed glass 20. In this case, the division channel 14 serves as a route that guides the up and down motion of the movable glass 18.

Here, an assembly structure for the division channel in the related art will be described below. As illustrated in FIG. 2, in order to fix the division channel 14 to the door inner panel, a bracket 22 for mounting the division channel having a "⊏" shape is provided.

As illustrated in a cross-sectional view of FIG. 3 which is taken along line A-A of FIG. 1, the bracket 22 for mounting the division channel, which is provided as described above, comes into close contact with an outer surface of an upper end portion of the door inner panel 10, and then is fixed and mounted by a bolt 24 that is inserted and fastened from an inner surface of the door inner panel 10.

In this case, the upper end portion of the door inner panel 10 does not have a uniform cross section, and a bolt fastening portion 21 of the door inner panel 10 has a shape that is convexly bent from the inside toward the outside so as to come into close contact with the bracket 22 for mounting the division channel.

In addition, the division channel 14 is installed at an outer end portion of the bracket 22 for mounting the division channel so that a rear end portion of the movable glass 18 of the rear door glass 16 is inserted into the division channel, and the division channel serves as a route along which the movable glass 18 is moved upward and downward.

FIG. 4 is a perspective view illustrating a state in which the division channel is mounted, reference numeral 26 indicates an inside weather strip, and the inside weather strip 26 is fitted with the upper end portion of the door inner panel 10 so as to serve to maintain watertight performance and airtight performance.

However, although the inside weather strip 26 may be fitted with the upper end portion of the door inner panel over the entire length thereof, a rear end of the inside weather strip 26 is cut at a position immediately before a position where the division channel 14 is mounted, as illustrated in FIG. 4.

That is, because there is a portion where the inner surface of the door inner panel 10 and the bracket for mounting the division channel are in close contact with each other and fastened by a bolt, the inside weather strip 26 is not fitted with the upper end portion of the door inner panel over the entire length thereof, but is cut at a position immediately before a portion where the bolt is fastened.

As illustrated in a cross-sectional view of FIG. 5 which is taken along line B-B of FIG. 4, the inside weather strip 26 is fitted with the upper end of the door inner panel 10, and the movable glass 18 of the rear glass is moved upward and downward between the inside weather strip 26 and an outside weather strip 28 in a state in which the outside weather strip 28 is fitted with an upper end of a door outer panel 30.

In FIG. 5, reference numeral 32, indicates a door trim that will be assembled to the inner surface of the door inner panel later.

Even if noise (sound of wind, sound that is generated by friction between a tire and a road when a vehicle is moving, or the like) is transmitted upward through a space between the door inner panel 10 and the door outer panel 30 when a vehicle is moved in a state in which the inside weather strip 26 is fitted with the upper end of the door inner panel 10 and the outside weather strip 28 is fitted with the upper end of the door outer panel 30, the inside weather strip 26 may easily block the noise which is transmitted to an interior room, as illustrated in FIG. 5.

However, because the rear end portion of the inside weather strip 26 is cut at the position where the division channel 14 is present, as described above, there is a problem in that noise (sound of wind, sound that is generated by friction between the tire and the road when the vehicle is moving, or the like), which is transmitted upward through the space between the door inner panel 10 and the door outer panel 30, enters the interior room because of absence of the inside weather strip 26, as illustrated in a cross-sectional view of FIG. 6 which is taken along line C-C of FIG. 4.

In addition, there are problems in that a load, which occurs when a door is strongly closed, is concentrated at the bolt fastening portion of the door inner panel in a state in which the bracket for the division channel which is installed on the division channel is in close contact with and bolted to the inner surface (bolt fastening portion) of the door inner panel, as described above, and as a result, a crack is formed in the door inner panel.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a device for blocking noise at a division channel of a rear door for a vehicle, in which an inside weather strip may be fitted with an upper end portion of a door inner panel over the entire length thereof by newly improving an assembly structure between the door inner panel and the division channel, thereby basically blocking noise from entering when a vehicle is moved.

In addition, the present invention has been made in an effort to provide a device for blocking noise at a division channel of a rear door for a vehicle, in which a coupling structure between a door inner panel and the division channel is improved in order to improve rigidity, thereby preventing a crack or the like from being formed in the door inner panel and the like due to a load that occurs when a door is closed.

In various aspects, the present invention provides a device for blocking noise at a division channel of a rear door for a vehicle. The device may include a door inner panel having an upper end portion formed with a substantially uniform cross-sectional shape, an inside weather strip fastened over an entire length of the upper end portion of the door inner panel, a reinforcing plate mounted on an outer surface of the door inner panel, and a bracket fixedly coupled to the reinforcing plate for mounting the division channel.

In an aspect, a tool entry hole may be formed in the door inner panel to fasten the reinforcing plate and the bracket using a bolt. In another aspect, the reinforcing plate may be mounted on the outer surface of the door inner panel by welding when the door inner panel is manufactured.

In some aspects, the reinforcing plate may include a panel coupling plate which comes into close contact with the outer surface of the door inner panel and is welded on the outer surface of the door inner panel, and a bracket coupling plate which is formed convexly toward an outside from a central portion of the panel coupling plate, formed integrally or monolithically with the panel coupling plate, and comes into close contact with the bracket, wherein the bracket is bolted to the bracket coupling plate for mounting the division channel.

In one aspect, a bolt fastening hole may be formed in a center portion of the bracket coupling plate, and a wrinkled portion for load distribution, which forms a substantially concentric circle structure, may be formed at a peripheral portion around the bolt fastening hole.

In some aspects, the bracket for mounting the division channel may include a mounting plate which comes into close contact with the reinforcing plate and is bolted to the reinforcing plate, a division channel supporting end which is formed integrally or monolithically with the mounting plate, bent at one side of the mounting plate, and installed on the division channel and a propping end which extends upward from an upper end of the mounting plate, and is formed integrally or monolithically with the mounting plate, wherein the propping end props a glass run for a fixed glass of a rear door glass.

The present invention provides at least the effects below.

Firstly, the cross-sectional shape of the upper end portion of the door inner panel is uniformly formed such that the inside weather strip may be easily inserted and fastened to the upper end portion of the door inner panel over the entire length thereof, thereby improving airtight performance and watertight performance, and basically preventing noise from entering an interior room when a vehicle is moving, by the inside weather strip.

Secondly, the reinforcing plate, which is provided to mount the division channel to the outer surface of the door inner panel, is separately mounted, thereby improving rigidity of a coupling portion between the door inner panel and the division channel.

Thirdly, the wrinkled portion, which is provided to distribute a load, is formed at the reinforcing plate, and the wrinkled portion for load distribution distributes a load caused by impact even if a load, which is caused by impact when the door is closed, is concentrated at a coupling portion between the bracket for mounting the division channel and the reinforcing plate, thereby preventing a phenomenon in the related art that a crack is formed in the inner panel or the like due to impact when the door is closed.

Fourthly, the propping end is formed to extend from the upper end portion of the bracket for mounting the division channel so as to prop the bottom portion of the glass run into which a lower end portion of the fixed glass of the rear glass is fitted, thereby more stably supporting the rear glass.

Other aspects and exemplary embodiments of the invention are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
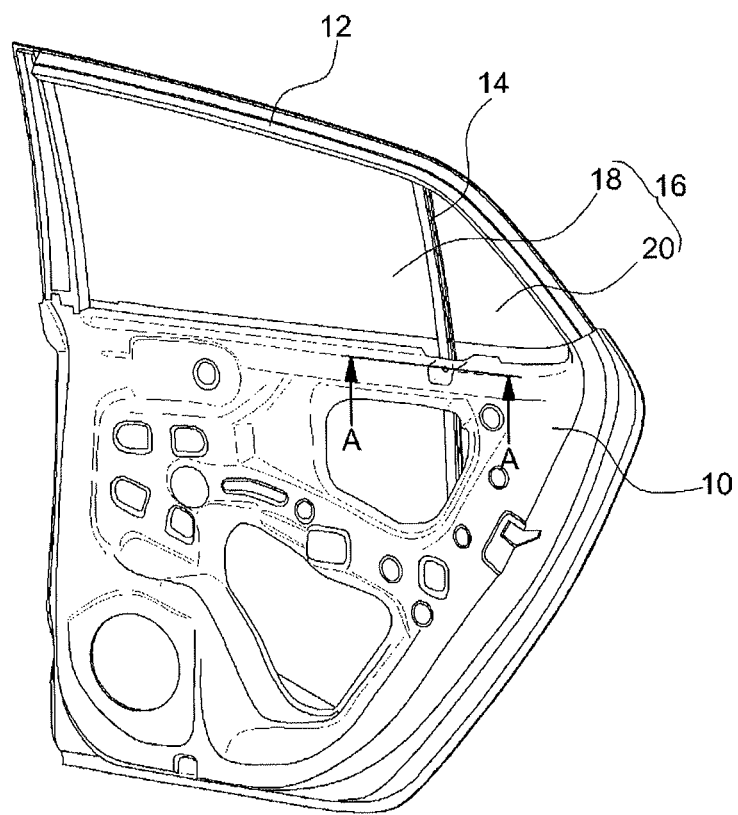
FIG. 1 is a perspective view illustrating a structure in the related art in which a division channel is mounted to a rear door.
Figure 2:
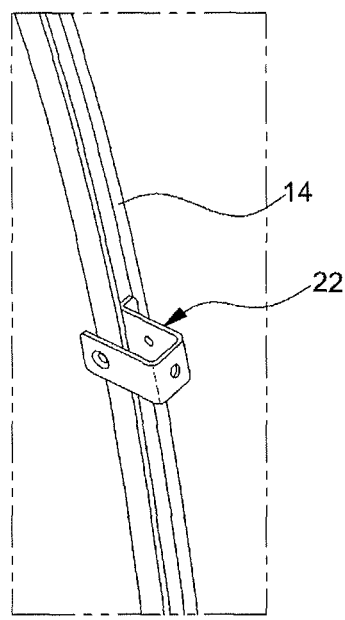
FIG. 2 is a perspective view illustrating a structure in which a bracket for mounting the division channel in the related art is installed on the division channel.
Figure 3:
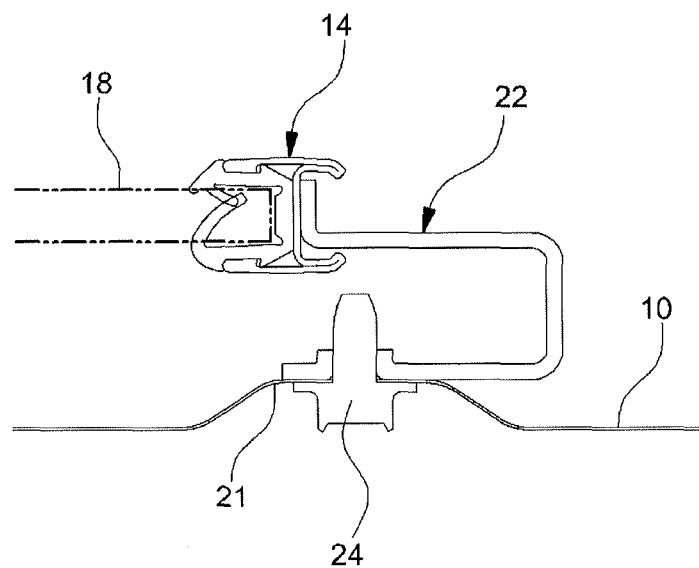
FIG. 3 is a cross-sectional view taken along line A-A of FIG. 1.
Figure 4:
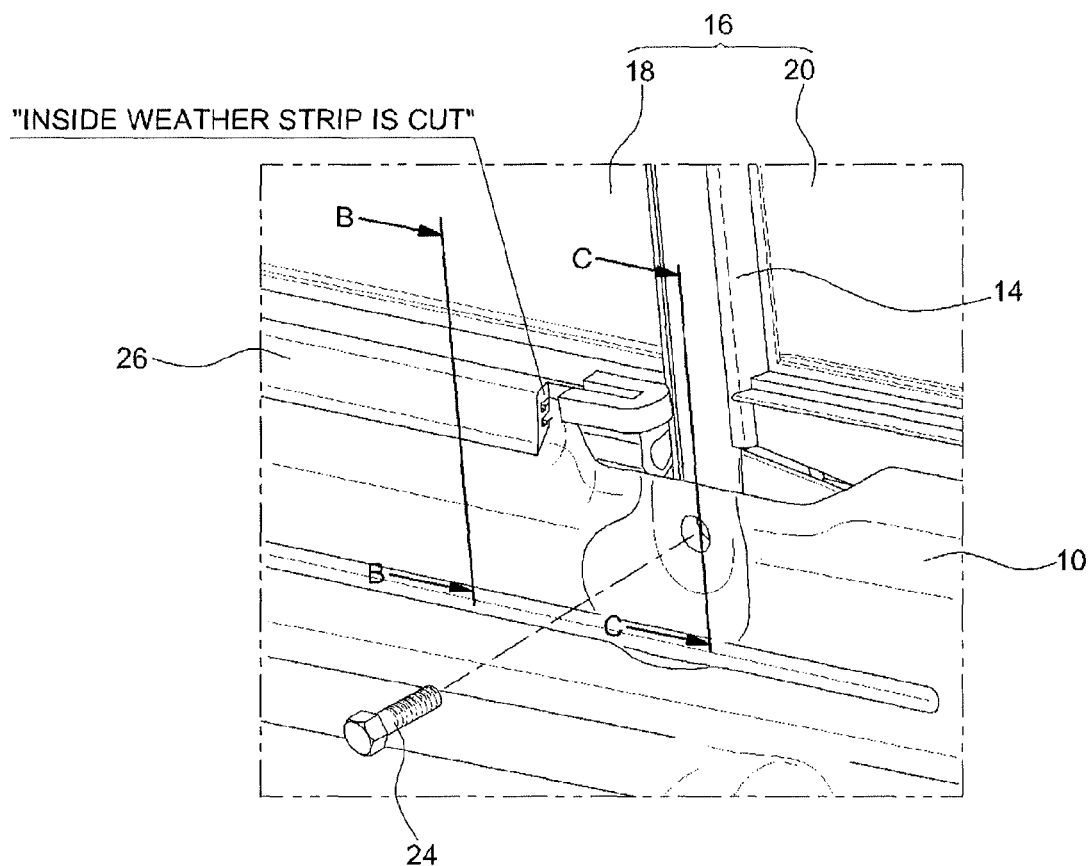
FIG. 4 is an enlarged perspective view illustrating a structure of a division channel mounting portion in the related art.
Figure 5:
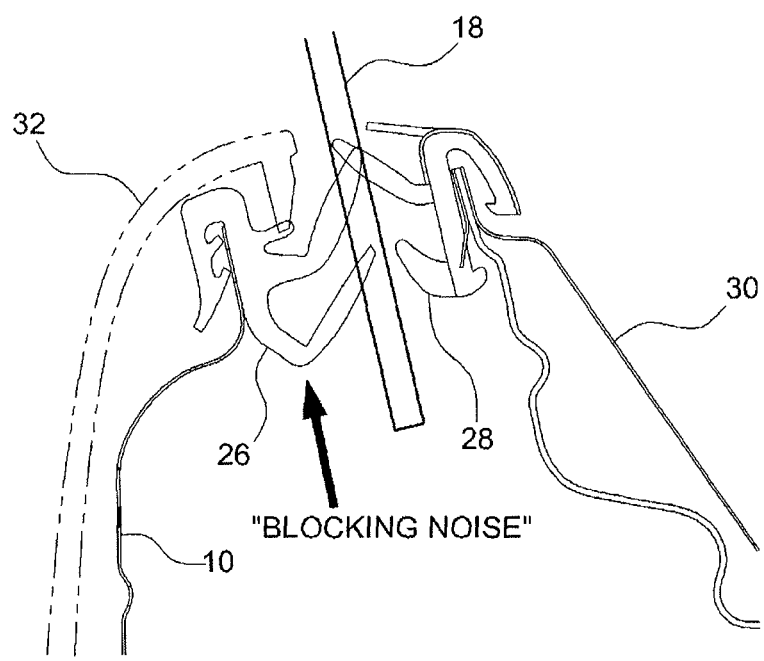
FIG. 5 is a cross-sectional view taken along line B-B of FIG. 4.
Figure 6:
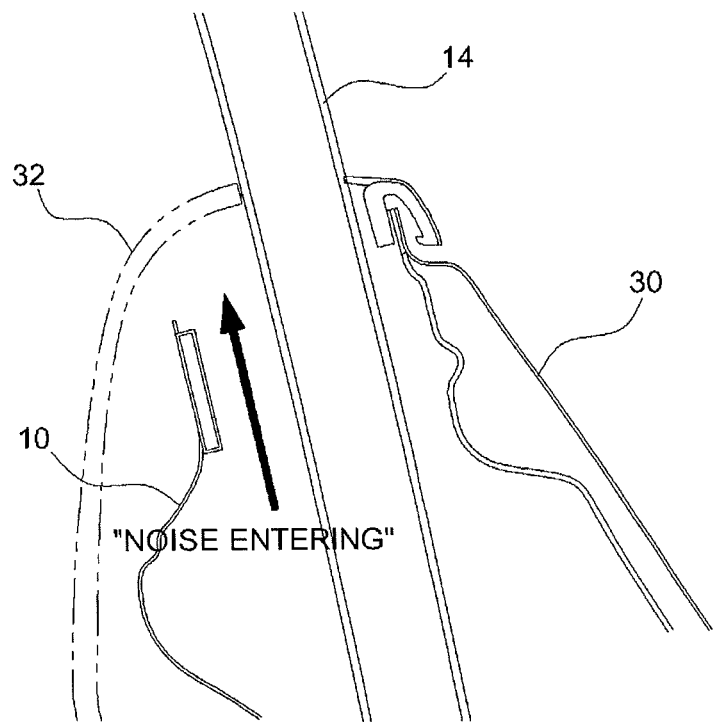
FIG. 6 is a cross-sectional view taken along line C-C of FIG. 4.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 7A:
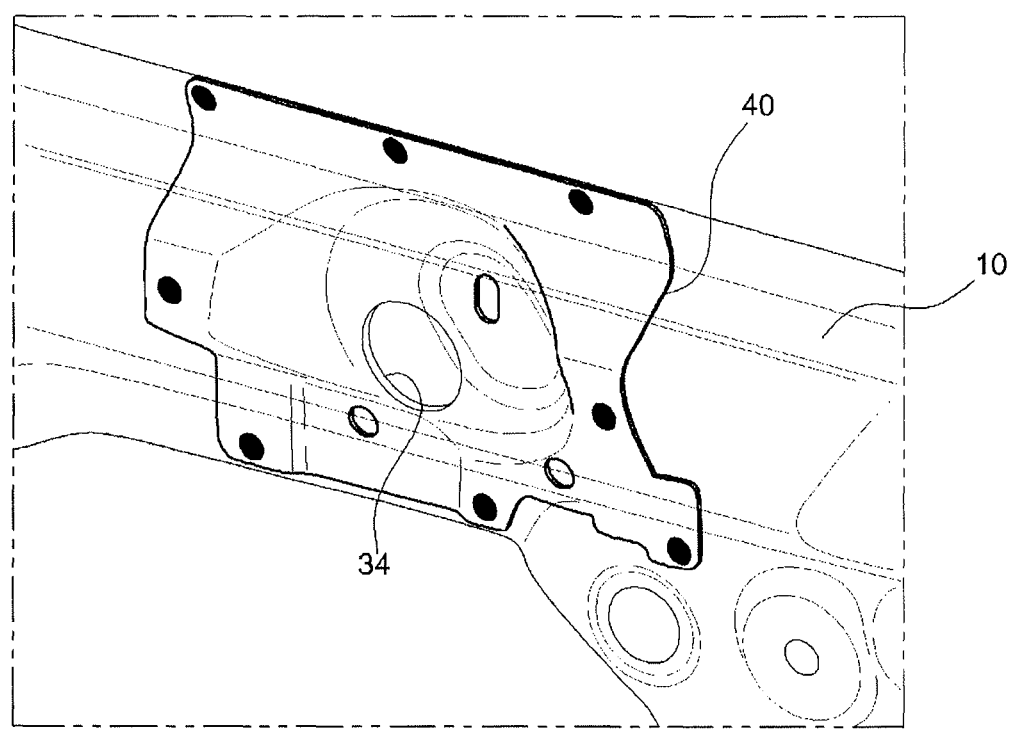
FIGS. 7A and 7B are perspective views illustrating an exemplary device for blocking noise at a division channel of a rear door for a vehicle according to the present invention, in which a door inner panel and a reinforcing plate are coupled.
Figure 7B:
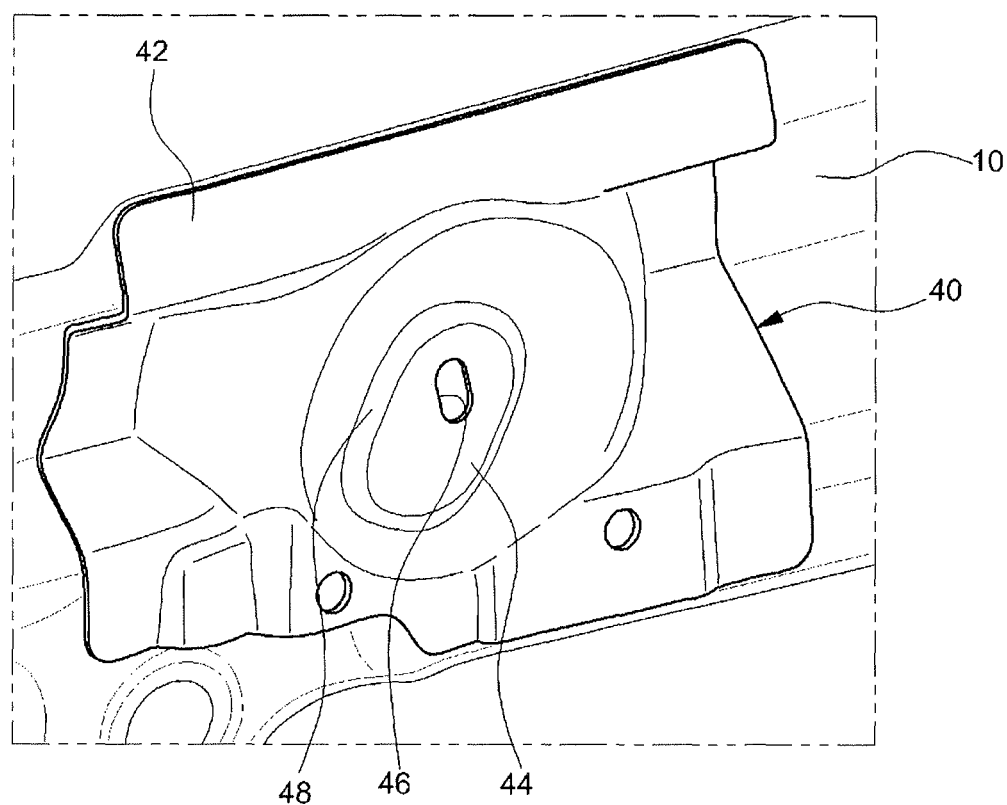

The accompanied FIGS. 7A and 7B are perspective views illustrating a device for blocking noise at a division channel of a rear door for a vehicle according to the present invention, in which a door inner panel and a reinforcing plate are coupled. As illustrated in FIGS. 7A and 7B, a cross-sectional shape of an upper end portion of a door inner panel 10 is formed to have a uniform or substantially uniform shape so that an inside weather strip 26 is inserted and fastened to the upper end portion of the door inner panel 10 over the entire range of a length of the door inner panel 10 in forward and rearward directions.

In the related art, a portion of an upper end portion section of a door inner panel, which is fastened to a division channel by a bolt, is formed in a shape that is convexly bent from the inside toward the outside, and thereby, there are problems in that an inside weather strip is cut at a position immediately before the division channel such that functions of blocking noise (sound of wind, sound that is generated by friction between a tire and a road when a vehicle is moving, or the like) may not be performed when a vehicle is moving.

Figure 10:
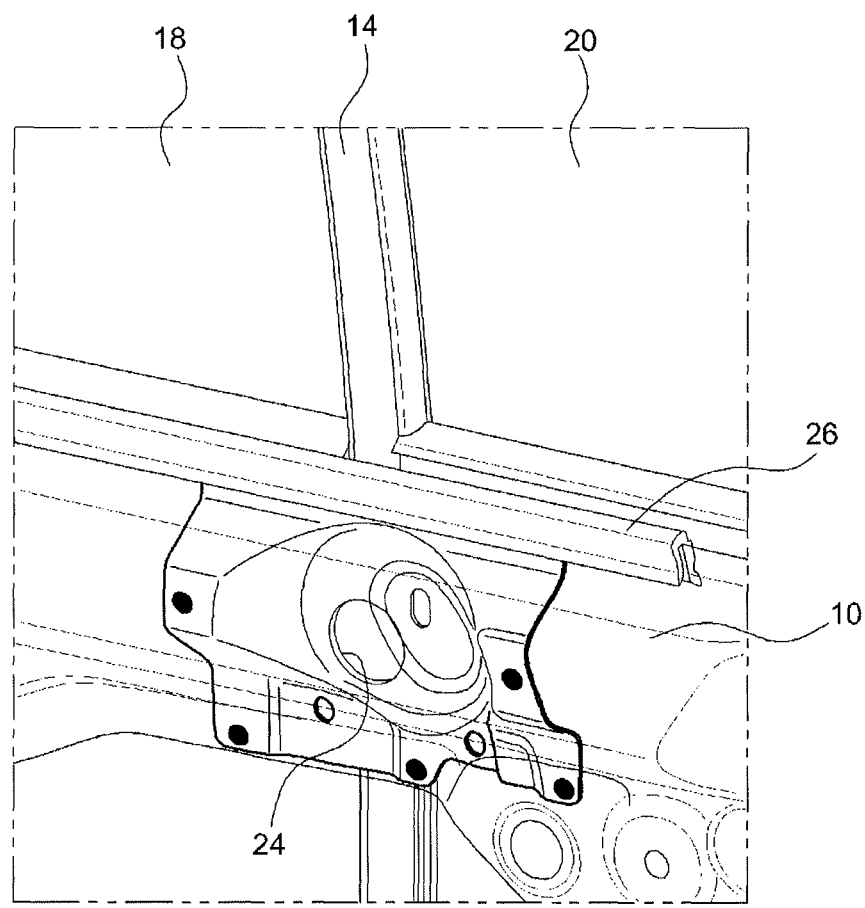
FIGS. 10 and 11 are a perspective view and a front view illustrating an exemplary device for blocking noise at a division channel of a rear door for a vehicle according to the present invention, in which an inside weather strip is mounted at an upper end of the door inner panel.
Figure 11:
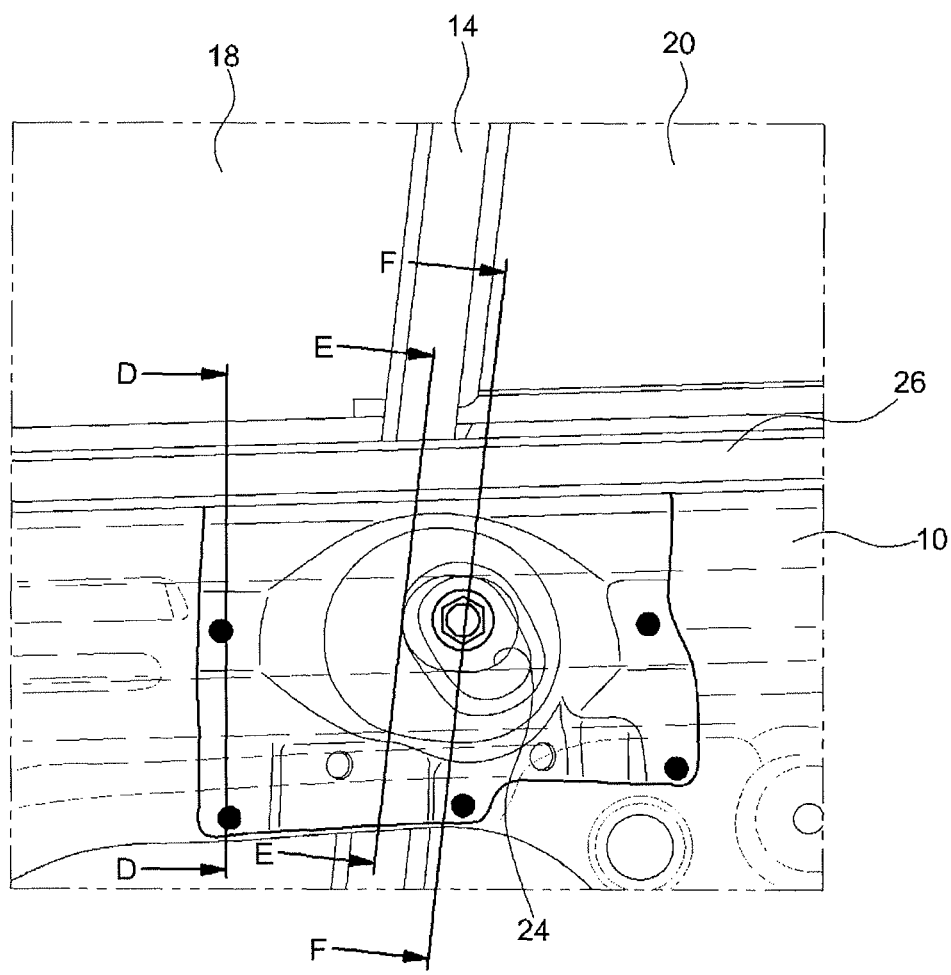

In the present invention, in order to resolve the aforementioned problems and/or other problems, the cross-sectional shape of the upper end portion of the door inner panel 10 is uniformly or substantially uniformly formed, and as illustrated in FIGS. 10 and 11, the inside weather strip 26 is inserted and fastened to the upper end portion of the door inner panel 10 over the entire length thereof without interference with a division channel 14, such that airtight performance and watertight performance of the inside weather strip 26 may be improved, and a function of basically blocking noise from entering an interior room when the vehicle is moving may be performed.

Since the cross-sectional shape of the upper end portion of the door inner panel 10 is uniformly formed as described above, a separate reinforcing plate 40, which is provided to be assembled with the division channel 14, is mounted on an outer surface of the door inner panel 10.

That is, when the door inner panel 10 is manufactured, the reinforcing plate 40, which is provided to be assembled with a bracket 50 for mounting the division channel which is installed on the division channel 14, is assembled in advance integrally with the outer surface of the door inner panel 10 by welding.

Figure 12:
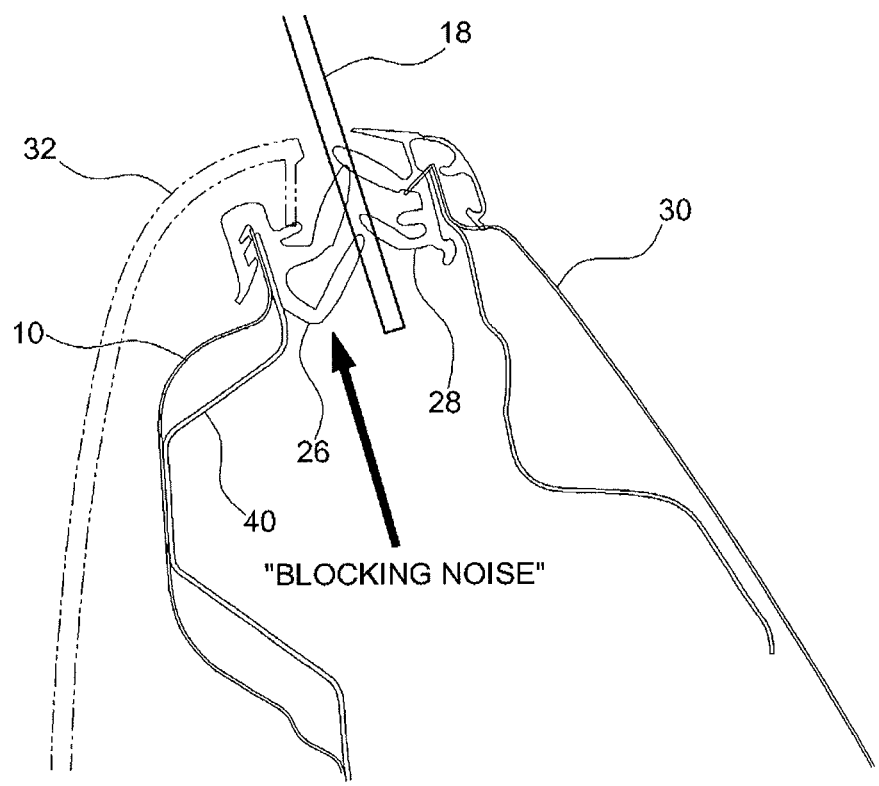
FIG. 12 is a cross-sectional view taken along line D-D of FIG. 11.

In this case, as illustrated in FIG. 12, an upper end portion of the reinforcing plate 40 overlaps with the upper end portion of the door inner panel 10, and the inside weather strip 26 is inserted and fastened to the overlapping portion.

As illustrated in FIGS. 7A and 7B, the reinforcing plate 40 includes a panel coupling plate 42 which comes into close contact with and is fixed or welded on the outer surface of the door inner panel 10, and a bracket coupling plate 44 which is convexly bent toward the outside from a central portion of the panel coupling plate 42 and formed integrally or monolithically with the panel coupling plate 42, and the bracket 50 for mounting the division channel, which is installed on the division channel, is assembled or fixedly coupled to an outer surface of the bracket coupling plate 44.

Figure 8:
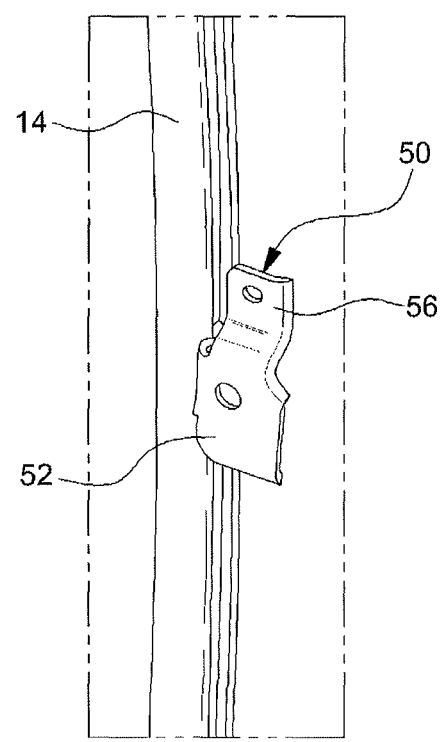
FIG. 8 is a perspective view illustrating an exemplary device for blocking noise at a division channel of a rear door for a vehicle according to the present invention, in which a bracket for mounting the division channel is installed on the division channel.
Figure 9:
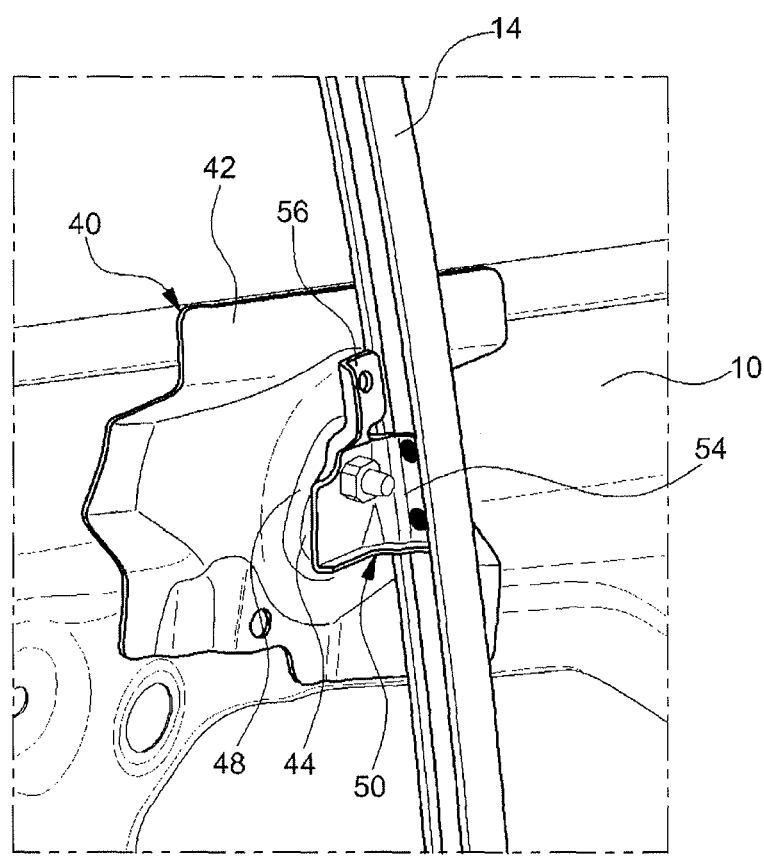
FIG. 9 is a perspective view illustrating an exemplary device for blocking noise at a division channel of a rear door for a vehicle according to the present invention, in which a reinforcing plate and a bracket for mounting the division channel are assembled.

As illustrated in FIGS. 8 and 9, the bracket 50 for mounting the division channel includes a mounting plate 52 which comes into close contact with and is fixed or bolted to the reinforcing plate 40, and a division channel supporting end 54 which is formed to be bent integrally or monolithically with one side of the mounting plate 52 and installed on the division channel 14, and a propping end 56, which props a glass run 36 for a fixed glass of a rear door glass, is further formed integrally or monolithically with an upper end of the mounting plate 52.

Therefore, in a state in which the division channel 14 is installed on the division channel supporting end 54 of the bracket 50 for mounting the division channel, the mounting plate 52 comes into close contact with the bracket coupling plate 44 of the reinforcing plate 40, and then is assembled with the bracket coupling plate 44 such as by a bolt.

To this end, a tool entry hole 34 is penetratively formed in the door inner panel 10 so that a worker may easily fasten the reinforcing plate 40 and the bracket 50 for mounting the division channel using a bolt. Accordingly, the worker places a tool to enter the tool entry hole 34 of the door inner panel 10, and fastens the bracket coupling plate 44 of the reinforcing plate 40 and the mounting plate 52 of the bracket 50 for mounting the division channel, which are in close contact with each other, using a bolt, such that the reinforcing plate 40 and the bracket 50 for mounting the division channel are easily assembled.

Figure 13:
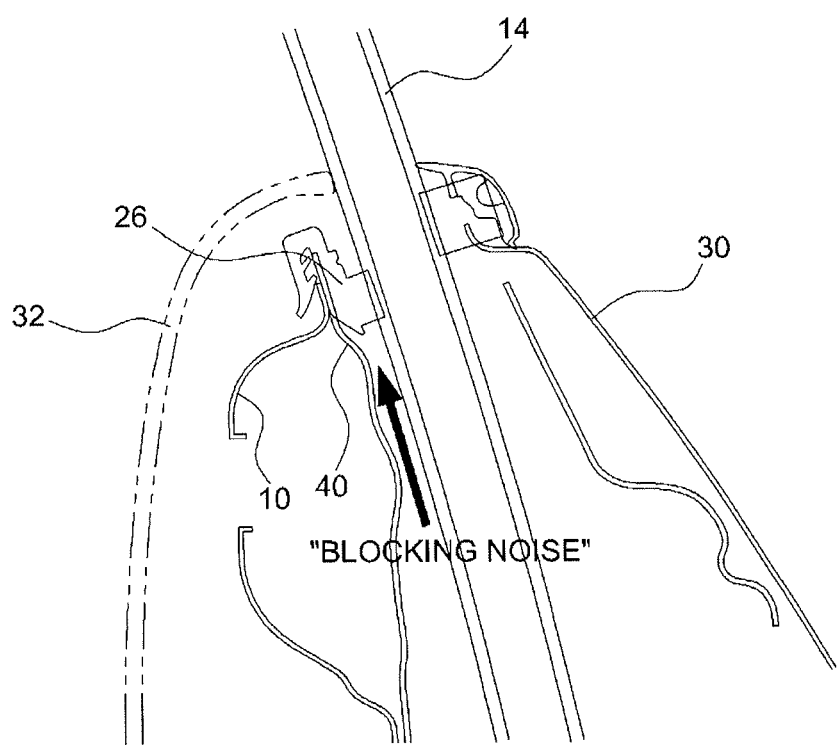
FIG. 13 is a cross-sectional view taken along line E-E of FIG. 11.
Figure 14:
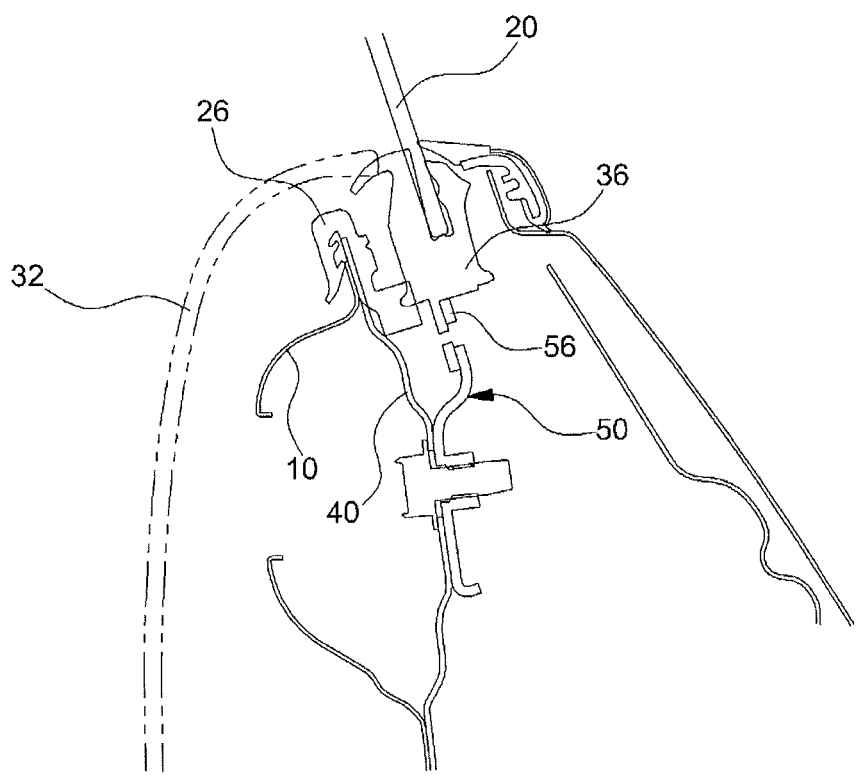
FIG. 14 is a cross-sectional view taken along line F-F of FIG. 11.

Therefore, as illustrated in the cross-sectional view of FIG. 12 which is taken along line D-D of FIG. 11 and illustrates a position where the division channel 14 is not present, noise (sound of wind, sound that is generated by friction between the tire and the road when the vehicle is moving, or the like), which is transmitted toward the interior room through a space between the door inner panel 10 and the door outer panel 30 when the vehicle is moving, may be blocked by the inside weather strip 26, and as illustrated in the cross-sectional views of FIGS. 13 and 14 which are taken along lines E-E and F-F of FIG. 11 and illustrate a state in which the division channel 14 is present, the inside weather strip 26 is present over the entire length section of the upper end portion of the door inner panel, and as a result, noise (sound of wind, sound that is generated by friction between the tire and the road when the vehicle is moving, or the like), which is transmitted toward the interior room, may be basically blocked.

Referring to FIGS. 7B and 9, according to some embodiments of the present invention, a bolt fastening hole 46, which is provided to fasten the bracket 50 for mounting the division channel using a bolt, is penetratively formed in a center portion of the bracket coupling plate 44 of the reinforcing plate 40, and particularly, a wrinkled portion 48 for load distribution, which forms one or more concentric circle structures or substantially concentric circle structures, is formed at a peripheral portion around the bolt fastening hole 46.

Therefore, even if a load, which occurs when a door is strongly closed, is concentrated at a bolt fastening portion in a state in which the reinforcing plate 40, which is welded on the outer surface of the door inner panel 10, and the bracket 50 for the division channel, which is installed on the division channel 14, are fastened to each other using the bolt as described above, the wrinkled portion 48 for load distribution, which is formed at the bracket coupling plate 44 of the reinforcing plate 40, serves to distribute the load, thereby easily preventing a crack from being formed in the door inner panel due to the load concentration in the related art.

Meanwhile, since the propping end 56, which props the glass run 36 for the fixed glass of the rear door glass, is further integrally or monolithically formed at the upper end of the mounting plate 52 of the bracket 50 for mounting the division channel, the propping end 56 props a bottom portion of the glass run 36 to which a lower end of the fixed glass 20 of the rear door glass 16 is inserted and fixed, as illustrated in FIG. 14, thereby more stably maintaining a state in which the fixed glass 20 is mounted.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for blocking noise at a division channel of a rear door for a vehicle, the device comprising:
   a door inner panel having an upper end portion formed with a substantially uniform cross-sectional shape;
   an inside weather strip fastened over an entire length of the upper end portion of the door inner panel;
   a reinforcing plate mounted on an outer surface of the door inner panel; and
   a bracket fixedly coupled to the reinforcing plate for mounting the division channel,
   wherein the bracket for mounting the division channel comprises:
   a mounting plate which comes into close contact with the reinforcing plate and is bolted to the reinforcing plate;
   a division channel supporting end which is formed integrally or monolithically with the mounting plate, bent at one side of the mounting plate, and installed on the division channel; and
   a propping end which extends upward from an upper end of the mounting plate, and is formed integrally or monolithically with the mounting plate, so as to prop a glass run for a fixed glass of a rear door glass.

2. The device of claim 1, wherein a tool entry hole is formed in the door inner panel to fasten the reinforcing plate and the bracket using a bolt.

3. The device of claim 1, wherein the reinforcing plate is mounted on the outer surface of the door inner panel by welding when the door inner panel is manufactured.

4. The device of claim 1, wherein the reinforcing plate comprises:
   a panel coupling plate which comes into close contact with the outer surface of the door inner panel and is welded on the outer surface of the door inner panel; and
   a bracket coupling plate which is formed convexly toward an outside from a central portion of the panel coupling plate, formed integrally or monolithically with the panel coupling plate, and comes into close contact with the bracket, wherein the bracket is bolted to the bracket coupling plate for mounting the division channel.

5. The device of claim 4, wherein a bolt fastening hole is formed in a center portion of the bracket coupling plate, and a wrinkled portion for load distribution, which forms a substantially concentric circle structure, is formed at a peripheral portion around the bolt fastening hole.

6. A device for blocking noise at a division channel of a rear door for a vehicle, the device comprising:
   a door inner panel having an upper end portion formed with a substantially uniform cross-sectional shape;
   an inside weather strip fastened over an entire length of the upper end portion of the door inner panel;
   a reinforcing plate mounted on an outer surface of the door inner panel; and
   a bracket fixedly coupled to the reinforcing plate for mounting the division channel,
   wherein the reinforcing plate comprises:
   a panel coupling plate which comes into close contact with the outer surface of the door inner panel and is welded on the outer surface of the door inner panel; and
   a bracket coupling plate which is formed convexly toward an outside from a central portion of the panel coupling plate, formed integrally or monolithically with the panel coupling plate, and comes into close contact with the bracket, wherein the bracket is bolted to the bracket coupling plate for mounting the division channel.

7. The device of claim 6, wherein a tool entry hole is formed in the door inner panel to fasten the reinforcing plate and the bracket using a bolt.

8. The device of claim 6, wherein the reinforcing plate is mounted on the outer surface of the door inner panel by welding when the door inner panel is manufactured.

9. The device of claim 6, wherein a bolt fastening hole is formed in a center portion of the bracket coupling plate, and a wrinkled portion for load distribution, which forms a substantially concentric circle structure, is formed at a peripheral portion around the bolt fastening hole.

* * * * *